April 8, 1924.
W. J. FOSTER ET AL
CURRENT INDICATING DEVICE
Filed Jan. 26, 1923
1,489,665
2 Sheets-Sheet 1
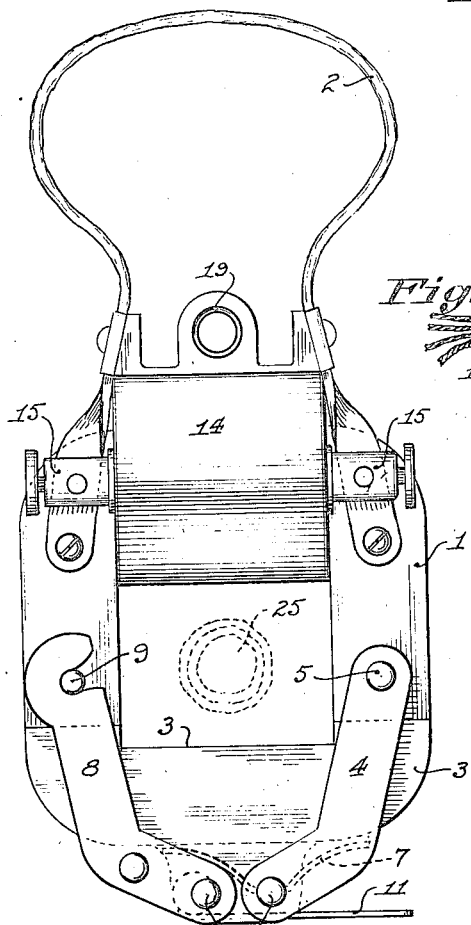
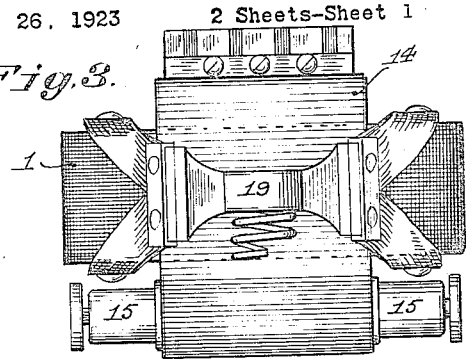
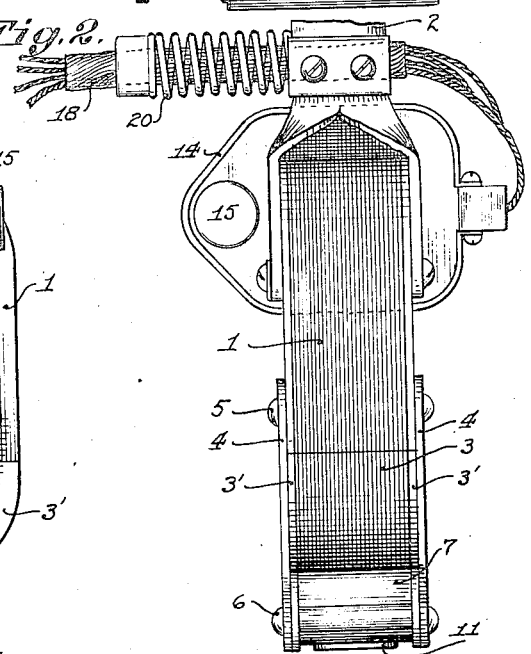
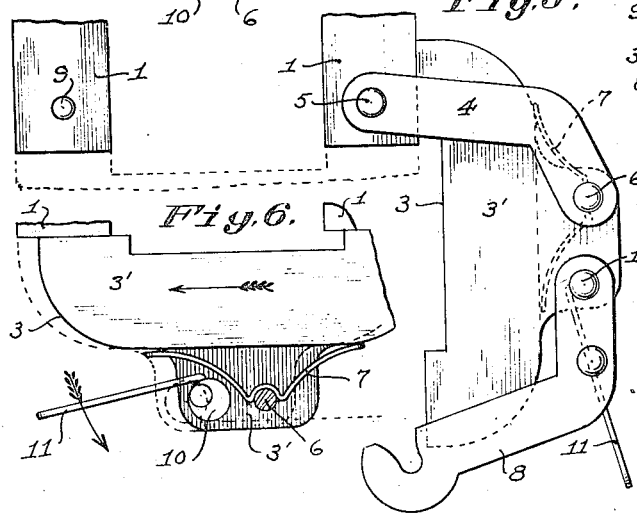
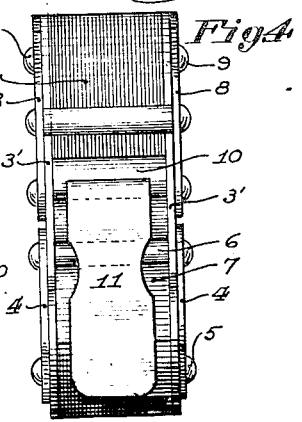

April 8, 1924.　　　　　　　　　　　　　　　　　　　1,489,665
W. J. FOSTER ET AL
CURRENT INDICATING DEVICE
Filed Jan. 26, 1923　　2 Sheets-Sheet 2
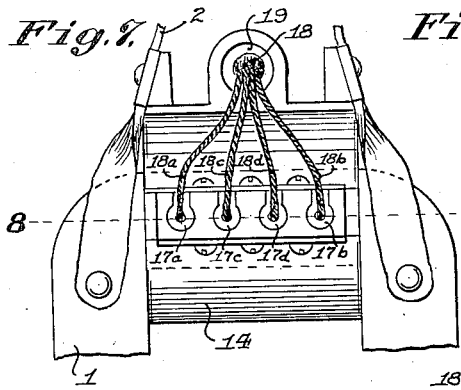
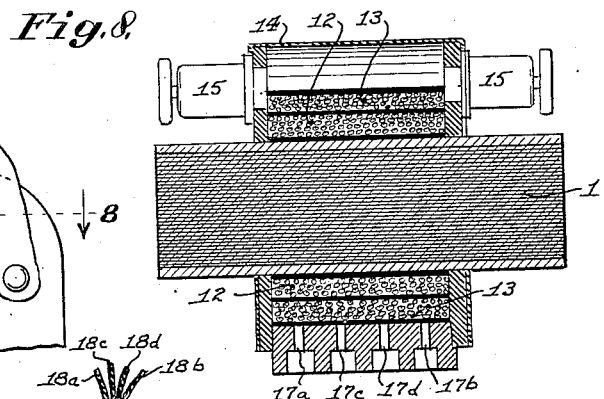
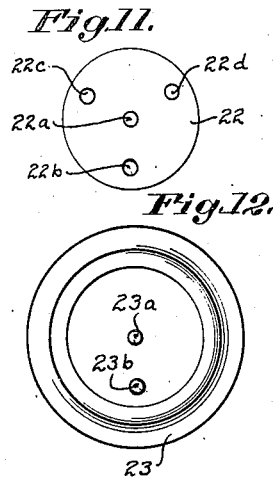
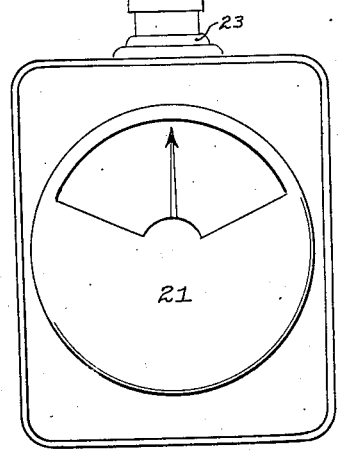
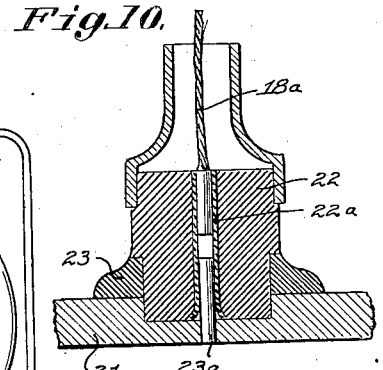
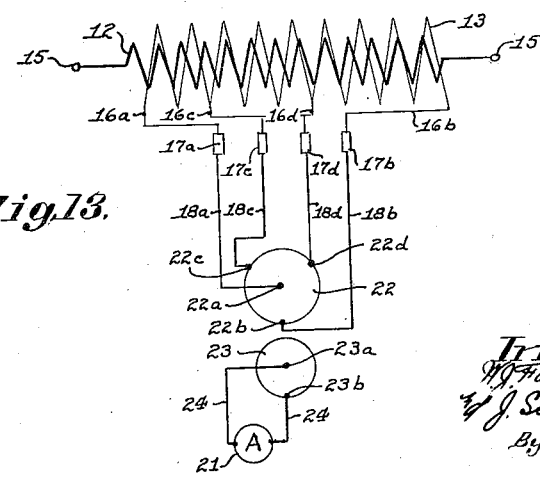

Patented Apr. 8, 1924.

1,489,665

UNITED STATES PATENT OFFICE.

WINSLOW J. FOSTER, WILLIAM W. SCHERER, AND JOHN SCHMID, OF OAKLAND, CALIFORNIA, ASSIGNORS TO WESTERN ELECTRO MECHANICAL CO. INC., OF OAKLAND, CALIFORNIA, A CORPORATION OF CALIFORNIA.

CURRENT-INDICATING DEVICE.

Application filed January 26, 1923. Serial No. 615,016.

*To all whom it may concern:*

Be it known that we, WINSLOW J. FOSTER, WILLIAM W. SCHERER, and JOHN SCHMID, citizens of the United States, residing at Oakland, in the county of Alameda and State of California, have invented certain new and useful Improvements in Current-Indicating Devices, of which the following is a specification.

The present invention relates to alternating current measuring devices of the type in which an induced current is passed through a suitable indicating device, the ratio between the unknown current and the indicating current induced thereby being known.

The object of the invention is to provide a simple portable device for measuring alternating currents, throughout a wide range of intensity, and which can be used either in series with the current carrying conductor, or in inductive relation thereto in cases where it is impracticable to break said conductor. To this end, the said invention comprises the novel construction which will now be fully described, it being understood that changes, within the scope of the claims hereto appended, may be made in the form and construction of the device without departing from the spirit of the invention.

In order to comprehend the invention, reference should be had to the accompanying drawings, wherein:—

Fig. 1 is a front elevation of the transformer or inductive member of our circuit measuring device.

Fig. 2 is a side elevation of the same.

Fig. 3 is a plan view of the same.

Fig. 4 is a bottom view of the same.

Fig. 5 is a front elevation of the lower portion of the transformer and magnet core, showing the gate open.

Fig. 6 is a part sectional fragmental elevation of the same showing the gate in its two successive closed positions.

Fig. 7 is a rear elevation of the upper portion of the transformer, showing the leads from the secondary coil.

Fig. 8 is a sectional plan taken on the line 8—8 of Fig. 7.

Fig. 9 is a front elevation of the indicating member or ammeter.

Fig. 10 is a vertical central section of the selective plural contact members for connecting the secondary coil to the indicating member.

Fig. 11 is a bottom plan of the removable contact member.

Fig. 12 is a top plan of the fixed contact member with which said removable member cooperates.

Fig. 13 is a diagram of the electrical connections of the device.

In the drawings, and referring for the present to Figs. 1 to 8 thereof, the numeral 1 designates an inverted substantially U-shaped magnet core, preferably built up of a plurality of laminations, and provided with a carrying handle 2. The open end of the core 1 is adapted to be closed, to form a complete magnetic path of low reluctance, by a laminated gate 3, the laminations thereof being held between side plates 3'. Said gate is hinged at one end to the cover 1 by a pair of side links 4, pivotally connected with said core by a pin 5 and with said gate by a pin 6. A leaf spring 7 is preferably provided to take up any play or looseness in the bearings of said pin 6.

The other end of the gate 3 is removably secured to the core 1 by a pair of hook-members 8 adapted to engage pins 9 projecting from said core. Said hook-members are pivotally mounted upon a rotatable pin 10, which is eccentrically journaled in the side plates 3' of the gate 3. A hand lever 11 is secured to said eccentric pin 10, by means of which it may be rotated.

When the gate 3 is open, it occupies the position shown in Fig. 5. To close it, it is swung upwardly and to the left, and the hooks 8 are caused to engage the pins 9. This brings the gate 3 into the position shown in full lines in Fig. 6, with its ends in loose contact with the ends of the core 1. The lever 11 is then moved, in the direction of the arrow, to the position shown in dotted lines, thereby rotating the eccentric pin 10 and causing the gate to be moved up into firm contact with the ends of the core 1, and at the same time moved to the left, to the final position shown in dotted lines in Fig. 6 and in full lines in Fig. 1. Thus the ends of the gate 3 are not only brought into firm contact with the ends of the core 1, but are caused to slide across said core ends, while in contact therewith, thereby causing, in effect, a wiped contact between the core and the gate, to insure the least possible magnetic reluctance at the joints. This feature is of considerable importance, because the accuracy of the reading of the device depends to a large extent on the reluctance of the closed magnetic circuit formed by the core 1 and the gate 3.

The upper portion or cross member of the core 1 is surrounded by two coils 12 and 13, Figs. 8 and 13, of insulated wire, the coil 12 being superposed upon the coil 13. Both coils are suitably insulated, and are enclosed by a protecting shield 14. The outer coil 12, which may be referred to as the primary coil, comprises a comparatively small number of turns of relatively heavy wire, and its ends are connected respectively to two exterior binding posts 15. The inner, or secondary coil 13 comprises a greater number of turns of finer wire, and has, in addition to the leads $16^a$ and $16^b$, Fig. 13, from its ends, other leads $16^c$ and $16^d$ connected with points intermediate its ends. All four leads $16^a$, $16^b$, $16^c$ and $16^d$ are connected with contact members $17^a$, $17^b$, $17^c$ and $17^d$ respectively, mounted at the side of the coil 13. A flexible cable 18, Figs. 2 and 7, comprising four insulated conductors $18^a$, $18^b$, $18^c$ and $18^d$ which are respectively connected with the contacts $17^a$, $17^b$, $17^c$, and $17^d$, is led out through a supporting ring 19 and a reinforcing helical spring 20.

The flexible cable 18 connects the secondary coil 13 with the indicating member of the device, said indicating member being preferably a suitable low resistance ammeter 21, Fig. 9, the construction of which forms no part of the present invention. The connection between the cable 18 and the ammeter 21, however, is an essential feature of the invention, inasmuch as it permits the selective use of a portion or the whole of the secondary coil 13. This connection comprises a member 22, Figs. 10 and 11, associated with the end of the cable 18, said member having four contact sockets $22^a$, $22^b$, $22^c$, and $22^d$, the socket $22^a$ being positioned in the center of the member 22, and connected with the cable lead $18^a$, and the sockets $22^b$, $22^c$, $22^d$, being equally spaced about said center socket, as shown, and respectively connected with the cable leads $18^b$, $18^c$, and $18^d$, as shown in Fig. 13. The member 22 is adapted to be removably associated with a co-operating member 23, Figs. 9, 10 and 12, secured to the ammeter 21, said member 23 having two projecting contact pins $23^a$ and $23^b$, the pin $23^a$ being positioned in the center and adapted for engagement and contact with the central socket $22^a$ of the member 22, and the pin $23^b$ being positioned for engagement and contact with any one of the sockets $22^b$, $22^c$, or $22^d$, depending on the relative angular positions of the two members. The pins $23^a$ and $23^b$ of the member 23 are connected with the ammeter 21 by leads 24, shown only in Fig. 13. Thus by altering the angular position of the removable member 22 with respect to the fixed member 23, the ammeter 21 may be connected with either the whole or a portion of the secondary coil 13.

In using the device to measure a current within the capacity of the primary coil 12, and which is flowing in a circuit which can be broken, the coil 12 is connected in series with the circuit whose current is to be measured, by means of the binding posts 15. The passage of the main circuit through the primary coil 12 induces a current of less intensity in the secondary coil 13, and this secondary current passes through the ammeter 21 and is indicated thereby. The ratio of the secondary current to the primary current may be given any one of three different and known values, by changing the angular position of the contact socket member 22, thereby connecting either the whole or a portion of the secondary coil with the ammeter, so that said ammeter may be caused to indicate within the limits of accuracy for a wide variation of the primary current.

For example, if the contact member 22 is so positioned that its contact $22^b$ connects with the contact $23^b$ of the member 23, then the whole of the secondary coil is connected with the ammeter, the circuit comprising the secondary coil 13, the lead $16^a$, the contact $17^a$, the flexible cable lead $18^a$, the contacts $22^a$ and $23^a$, the ammeter 21, the contacts $23^b$ and $22^b$, the cable lead $18^b$, the contact $17^b$, and the lead $16^b$ to the coil 13. In this case the secondary current is relatively small with relation to the primary current, on account of the greater number of turns in the secondary coil 13 than in the primary coil 12. If the secondary current is not of sufficient intensity to cause an accurate indication by the ammeter, the position of the member 22 may be changed to cause its contact $22^d$ to connect with the contact $23^b$, thereby connecting in the ammeter circuit only that portion of the secondary coil between the leads $16^a$ and $16^b$, and thus increasing the secondary current. If the indication of the ammeter is still insufficient for the proper accuracy, the position of the member 22 can be again changed to cause its contact $22^c$ to connect with the contact $23^b$, thus connecting in the ammeter circuit only that portion of the secondary coil between the leads $16^a$ and $16^c$, and thereby still further increasing the secondary current. Thus, a wide range of primary current may be indicated within sufficiently narrow limits on the ammeter to insure accuracy. Any well known method of correlating the ammeter reading to the intensity of the primary current may be employed, such as multiplying the reading by a different constant for each position of the contact member 22, or the employment of plural scales on the ammeter.

When the device is used for measuring a current too large to be passed through the primary coil 12, or when it is impracticable to break the circuit in which the current is flowing, as for example when it is desired to measure the current in a large wire or cable of a power system, the gate 3 is opened and the core 1 is positioned about the cable, in a plane at right angles to the axis thereof, as shown in Fig. 1, wherein the cable carrying the current to be measured is indicated at 25. The gate 3 is then closed, forming with the core 1 a complete magnetic circuit lying within the magnetic field surrounding said cable 25 and substantially parallel with the lines of force thereof. The magnetic field thereupon induces a current in the secondary coil 13, which is indicated by the ammeter 21. As before, the ratio of the induced meter current to the current flowing in the cable 25 can be given any one of three known values by changing the angular position of the contact member 22 with respect to its co-operating member 23, so that the ammeter can be made to indicate within the limits of accuracy for a comparatively wide range of current in the cable 25. In this use of the device, the primary coil 12 remains disconnected, and is not used. The method of connecting the gate 3 to the core 1 not only enables the ready positioning of said core about the cable 25 when current is to be measured, but also, by making firm and clear contact between said gate and the ends of said core, provides a constant value for the reluctance of the magnetic circuit including said core and said gate, thereby insuring the greatest possible accuracy in the indications of the device.

Although the secondary coil 13 has been shown and described as having four leads or taps taken from it, thereby providing three steps in the correlation of the ammeter, it is obvious that a greater number of such taps may be taken from the coil 13 if desired, each tap having a corresponding lead in the connecting cable 18 and a corresponding contact in the member 22.

Having thus described our invention, what we claim as new and desire to protect by Letters Patent of the United States is:—

1. A current indicating device comprising a coil, means connected therewith for indicating a current induced therein, a substantially U-shaped magnetic core upon which said coil is wound, a removable magnetic gate associated with the ends of said core to form therewith a closed magnetic circuit, a link for separably securing said gate to said core, an eccentric pivot pin for one end of said link, and means for rotating said eccentric pin to press said gate against the ends of said core.

2. A current indicating device comprising a coil, means connected therewith for indicating a current induced therein, a substantially U-shaped magnetic core upon which said coil is wound, a removable magnetic gate associated with the ends of said core to form therewith a closed magnetic circuit, a link for separably securing said gate to said core, and mechanism associated with said link for pressing said gate against and sliding it across the ends of said core.

In testimony whereof we have signed our names to this specification.

WINSLOW J. FOSTER.
WILLIAM W. SCHERER.
JOHN SCHMID.